INVENTOR
J. M. MacLEAN
By: Fetherstonhaugh & Co.
ATT'YS

UNITED STATES PATENT OFFICE 2,491,746

RESILIENT WHEEL STRUCTURE

James Matthew MacLean, Detroit, Mich.

Application February 10, 1947, Serial No. 727,524

7 Claims. (Cl. 152—40)

This invention relates to a resilient wheel structure.

There is a need for an inexpensive resilient wheel which will effectively and efficiently replace present day wheel and pneumatic tire combinations for highway vehicles and the like.

An object of the present invention is to provide a wheel wherein the rim element carrying the tire member connects to an inner annular resilient strap at circumferentially spaced apart intervals therealong, the hub element of the wheel extending to connect to the annular resilient strap at points between the points of connection of the rim element to the strap.

A still further object of the present invention is to provide a resilient wheel as before which comprises a minimum of elements capable of production by mass production means to provide a practical wheel of this class at minimum cost.

With these and other objects in view, my invention generally comprises a hub member mountable on a highway vehicle or the like, a resilient strap means disposed outside the hub structure, said hub being connected thereto at spaced intervals perimetrically thereof and a rim element connected to said strap means at spaced intervals perimetrically thereof between the points of connection of said hub element thereto.

Other objects of the present invention will be evident from a study of the following specification taken in conjunction with the accompanying drawings.

Figure 6:
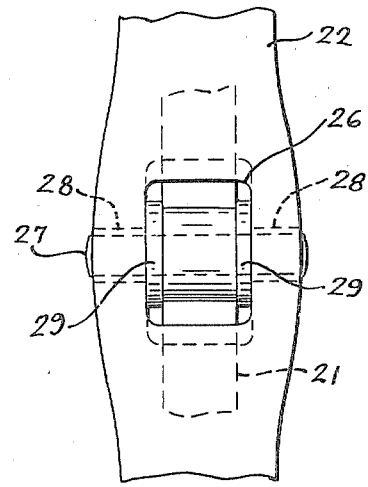

Figure 6 indicates a conventional method of attaching the strap to the post.

Figure 7:
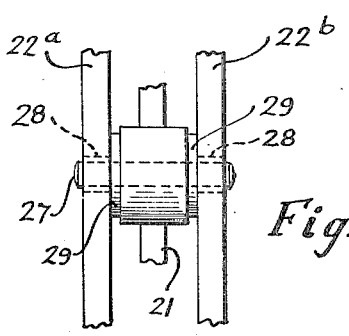

Figure 7 indicates an alternative strap means for the posts of Figure 6.

Figure 1:
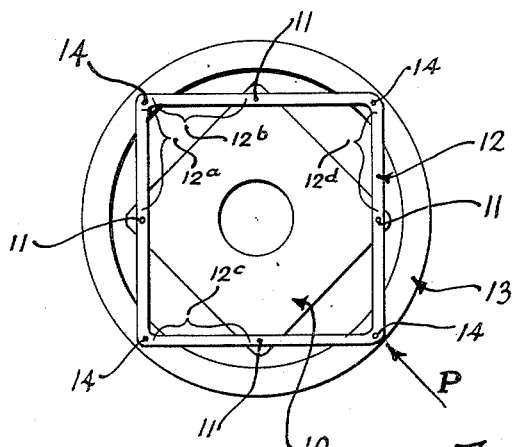
Figure 1 is a diagrammatic view of a simple form of resilient wheel according to the present invention indicating the underlying principle adopted.
Figure 4:
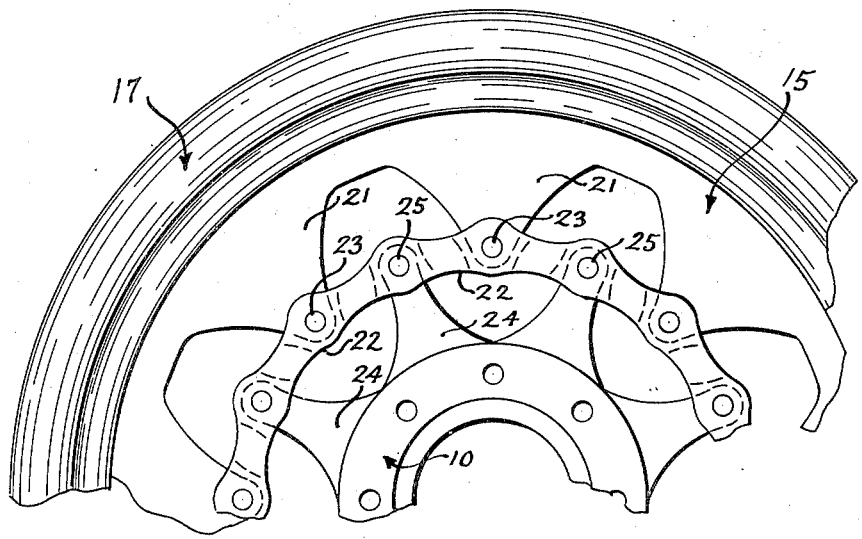
Figure 4 is a cutaway elevation of a resilient wheel of practical form according to the present invention.
Figure 8:
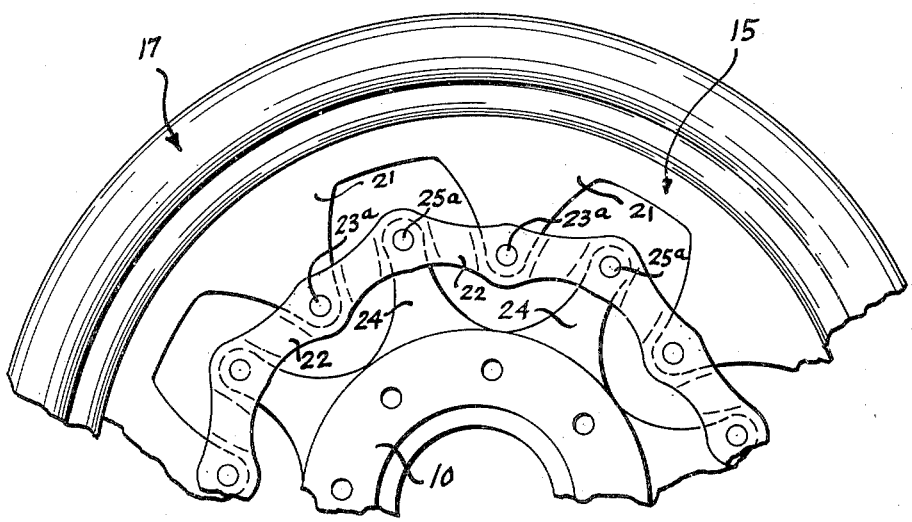

Figure 8 shows a practical form of the wheel disclosed in Figure 1 substantially in accordance with the general structure of Figure 4.

Figure 9:
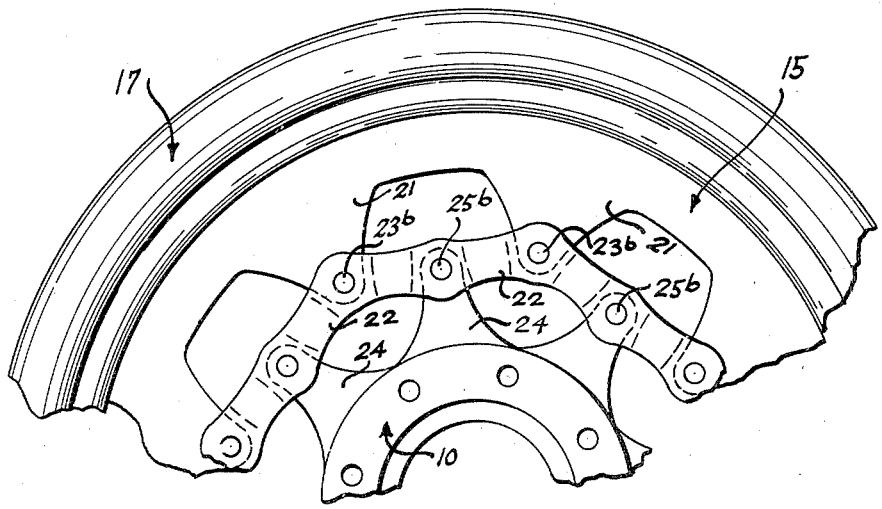

Figure 9 is a further alternative according to the present invention disclosing a form of wheel where the points of connection of the rim element to the strap member are in line with and between the points of connection of the hub element to the strap member at the no-load position.

Referring to the drawings and particularly to Figure 1, it will be observed that my invention relates particularly to that type of wheel wherein the hub element 10 is connected as at 11 to the continuous strap means 12 at predetermined perimetric intervals therealong. The rim element 13 is connected as at 14 to the strap means 12 between the points of connection 11 of the hub element to the strap. The strap means 12 is continuous and formed of suitable high-grade resilient material. It will be observed that under load P applied to the rim 13 in the direction shown (assuming hub 10 stationary) that the portions 12a, 12b, 12c and 12d of the strap means 12 will be under tension whereas the remainder would be under compression, the minimum number of segments under tension corresponding to the number of connecting points of the hub member to the strap means, or alternatively, the number of connecting points of the rim member to the strap means.

Figure 2:
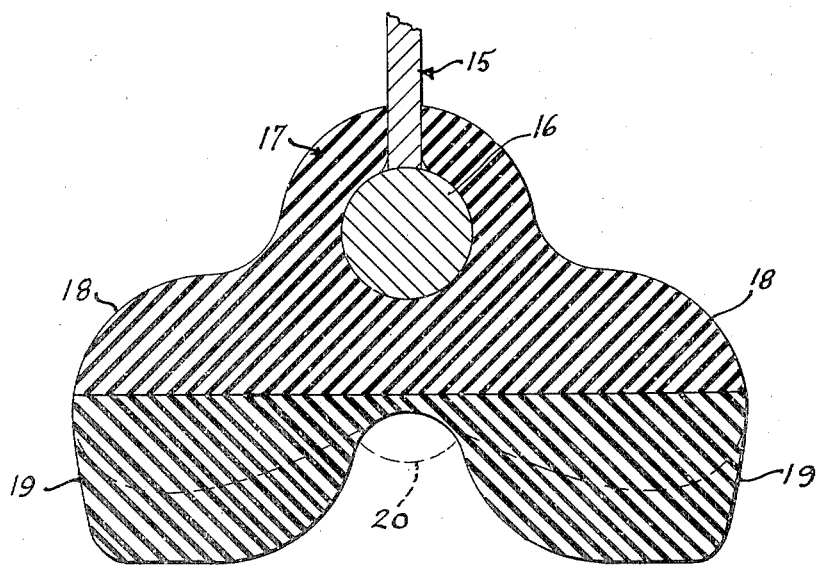
Figure 2 is a sectional view of a tire member designed for co-operation with the wheel structure of the present invention.

Referring to Figure 2, a tire member for suitable co-operation with a practical structure of wheel according to the principle above described with reference to Figure 1, and shown also in Figures 4, 8, and 9 is shown being formed integrally with the rim structure. The rim web 15 mounts the circumferential ring member 16, the latter being either hollow or solid as desired depending on over-all weight consideration for the complete wheel and the stress conditions to be encountered. The ring 16 is enclosed by a body 17 preferably of a high-grade resilient material extending outwardly to form a flange in the arm portion 18. Parallelly disposed annular tread members 19 of cheap tread rubber or other suitable material are bonded to the arm portions 18 of the body 17. At maximum deflection, the tire member will take the position indicated in Figure 3, and in this connection it may be desirable to include a centrally disposed bumper 20 in the elastic body 17.

In one form, as indicated in Figure 4, the rim web 15 extends inwardly by the rim post members 21 to connect to the resilient strap 22 as at 23. Further, the hub element 10 extends outwardly by the hub posts 24 to connect to the strap 22 as at 25, the latter points of connection being substantially intermediate of the points of connection 23 of the rim posts 21. The preferred method of connecting is indicated in Figure 6 where it is observed that the resilient strap 22 has an orifice 26 designed to accommodate the free extremity of a post 21 or 24 as the case may be. The post mounts a shaft 27 which extends laterally thereof to engage the bushings 28 in the strap 22. The bushings 28 may be either of a suitable metal or of fabric, if desired. To protect the strap 22 against chaffing, the washers 29 are shown separating the boundaries of the orifice 26 from the upper extremity of the posts 21 and 24. It is apparent, of course, that the strap 22 may be split to form two straps, 22a and 22b, mountable independently on the posts as in Figure 7.

Figure 3:
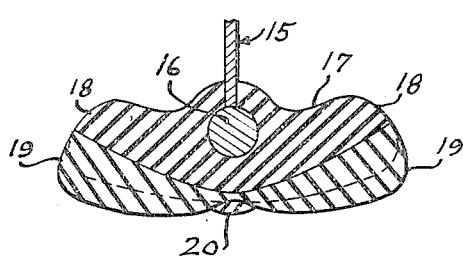
Figure 3 is a sectional view of the tire of Figure 2 under maximum deflection.
Figure 5:
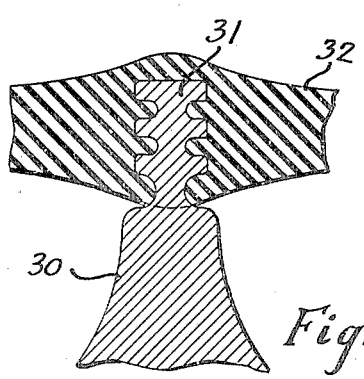
Figure 5 is a sectional view of a connecting post and strap of the wheel indicating a particular design of post with regard to attachment to the strap.

It is obvious that various methods may be employed for connecting the posts to the strap and that the alternative of Figure 5 is presented to indicate the scope of this invention in this regard. Here, a post 30 extends to form a serrated or suitably grooved mounting portion 31 over which a strap member 32 may be formed. Advantages of this structure lie in the fact that it is greatly simplified and that if desired in a wheel of the type proposed, the rim and hub structure substantially as indicated in Figure 3, could be mounted by a strap 32 relevant to one another by forming said strap on assembly around the upper extremities of the post where such are suitably grooved as described.

Referring to Figure 8, a modification of Figure 4 is shown wherein like numerals represent like elements of construction. A feature here is the alignment of connecting point 23a of the posts 21 to rim element 15 with a theoretical line extending between the points of connection 25a of the hub element posts 24 to the strap means 22. An obvious alternative is disclosed in Figure 9 wherein the points of connection 25b of the hub element posts 24 are between and in line with adjacent points of connection 23b of the posts 21 of the rim element 15. In both cases the specific embodiment shown allow greater freedom of either the rim posts 21 or hub posts 24, depending upon the requirements of design, which facilitates greatly the calculation of anticipated deflections in the strap member and the design of the strap member. It is, therefore, evident that the forms shown in Figures 8 and 9 provide a wheel of this class of high functional efficiency.

Many alternatives will be apparent to skilled persons with regard to the method and means employed for fixing the strap member described to the posts of the rim and hub, although specific embodiments of preferred structure have been shown. It is submitted that the spirit of the present invention extends to the types of obvious mechanical expedience in the modifications of the structure shown.

It is, therefore, intended that the present disclosure should not be construed in a limiting sense other than that indicated by the scope of the following claims.

What I claim as my invention is:

1. A wheel for highway vehicles and the like comprising a hub member and a rim member disposed in spaced apart relation from one another, a resilient strap member connecting the rim member to the hub member and holding the same in said spaced apart relation, said rim member being connected to said strap means at points between the points of connection of said hub member to said strap means, the point of connection of said rim member to said strap means and the two adjacent points of connection of said strap means to said hub member being normally disposed in a straight line under no-load conditions, said points of connection at normal load condition being disposed within an annular region located substantially midway between the centre of said hub and the outer extremity of said rim member, said rim member having a plurality of cut-away portions disposed about the points of connection of said hub member to said strap member to provide freedom of movement of said points of connection and said strap member in the direction of said rim member, said hub member also having cut-away portions located about the points of connection of said rim member to said strap member to provide freedom of said points of connection and said strap member in the direction of said hub member.

2. A wheel for highway vehicles and the like comprising a hub member and a rim member disposed in spaced apart relation from one another, a resilient strap member connecting the rim member to the hub member and holding the same in said spaced apart relation, said rim member being connected to said strap means at points between the points of connection of said hub member to said strap means, the points of connection of said hub member and said strap means and two adjacent points of connection of said strap means to said rim member being normally disposed in a straight line under no-load conditions, said points of connection at normal load condition being disposed within an annular region located substantially midway between the centre of said hub and the outer extremity of said rim member, said rim member having a plurality of cut-away portions disposed about the points of connection of said hub member to said strap member to provide freedom of movement of said points of connection and said strap member in the direction of said rim member, said hub member also having cut-away portions located about the points of connection of said rim member to said strap member to provide freedom of said points of connection and said strap member in the direction of said hub member.

3. A wheel for highway vehicles and the like comprising a rim web adapted to receive a tire member and extending inwardly to form posts, a hub member and hub posts extending outwardly thereof, resilient strap means designed to connect between the free extremities of the posts of the rim member and the posts of the hub member, orifices in said strap member designed to accommodate the free extremities of said posts, a shaft extending laterally through each of said ends of said posts, bushings in said strap designed for slidable reception on said shaft and washers separating the boundaries of said orifice from the surfaces of said post adjacent said pin to provide pivotal freedom of said strap means on said shaft.

4. A wheel for highway vehicles and the like comprising a rim web adapted to receive a tire member and extending inwardly to form posts, a hub member and hub posts extending outwardly thereof, resilient strap means designed to connect between the free extremities of the posts of the rim member and the posts of the hub member, a grooved mounting portion formed on the free extremities of the posts of the rim and hub, said resilient strap means being formed over the grooved portions of said posts to permanently connect said strap means thereto to provide a wheel structure capable of assembly in one operation.

5. A wheel comprising a rim web extending inwardly to form posts, a hub member and hub posts extending outwardly therefrom between the posts of the rim web, and a pair of resilient straps disposed in parallel spaced apart relation transversely of the wheel and connecting to the free ends of the hub posts and the rim posts.

6. A wheel for highway vehicles and the like, comprising a rim web adapted to receive a tire member, rim posts integrally formed with and extending inwardly from said rim web and defined by cut-away portions in the latter, a hub member including a hub web having cut-away portions defining hub posts extending radially and outwardly therefrom in spaced apart relation to the posts of said rim member, a substantially annular resilient strap member connected to the posts of said rim member and the posts of said hub member and forming the sole means of continuity therebetween, said cut-away portions of said rim web and said hub web being designed to allow free flexing movement of said strap member.

7. A wheel for highway vehicles and the like, comprising a rim web adapted to receive a tire member, rim posts integrally formed with and extending inwardly from said rim web, and defined by cut-away portions in the latter, a hub member including a hub web having cut-away portions defining hub posts extending radially and outwardly therefrom in spaced apart relation to the posts of said rim member, a substantially annular resilient strap member connected to the posts of said rim member and the posts of said hub member and forming the sole means of continuity therebetween, said cut-away portions of said rim web and said hub web being designed to allow free flexing movement of said strap member, enlarged orifices in said strap member designed to accommodate the extremities of the posts of the rim and hub members, and means for pivotally connecting each post within an orifice of said strap member, each orifice being designed for clearance of said strap member with the end surfaces of its connecting post, except the side surfaces thereof.

JAMES MATTHEW MacLEAN.

REFERENCES CITED

The following references are of record in the file of this patent:

UNITED STATES PATENTS

| Number | Name | Date |
| --- | --- | --- |
| 278,071 | Allen | May 22, 1883 |
| 482,175 | Hollafolla | Sept. 6, 1892 |
| 611,715 | Southall | Oct. 4, 1898 |
| 1,098,577 | Johnstone | June 2, 1914 |
| 1,384,902 | Kinz | July 19, 1921 |